United States Patent [19]

Heijnemans et al.

[11] Patent Number: 4,963,016
[45] Date of Patent: Oct. 16, 1990

[54] COMPACT REAR-PROJECTION SYSTEM WITH OBLIQUELY INCIDENT LIGHT BEAM

[75] Inventors: Werner A. L. Heijnemans; Gijsbertus Bouwhuis, both of Eindhoven, Netherlands

[73] Assignee: U.S. Philips Corporation, New York, N.Y.

[21] Appl. No.: 880,974

[22] Filed: Aug. 18, 1986

[30] Foreign Application Priority Data

Mar. 18, 1986 [NL] Netherlands .......................... 8600684

[51] Int. Cl.⁵ ...................... G03B 21/10; G03B 21/60
[52] U.S. Cl. ........................................ 353/74; 353/78; 350/128
[58] Field of Search .................. 353/74, 77, 78, 79, 353/99; 350/123, 127, 128, 129; 358/60, 239, 231, 237

[56] References Cited

U.S. PATENT DOCUMENTS

| | | | |
|---|---|---|---|
| 3,580,661 | 5/1971 | Cooper, Jr. ......................... | 350/128 |
| 3,848,980 | 11/1974 | Plummer .............................. | 353/77 |
| 4,173,399 | 11/1979 | Yevick ................................. | 353/78 |
| 4,257,694 | 3/1981 | Reinhard ............................. | 353/78 |
| 4,482,206 | 11/1984 | Van Breemen ..................... | 350/128 |
| 4,512,631 | 4/1985 | VanBreemen ...................... | 350/128 |
| 4,531,812 | 7/1985 | Oguino ............................... | 350/128 |
| 4,578,710 | 3/1986 | Hasegawa ........................... | 353/77 |
| 4,674,836 | 6/1987 | Yata et al. .......................... | 350/128 |

FOREIGN PATENT DOCUMENTS 2750891 5/1978 Fed. Rep. of Germany ...... 350/128
197969 11/1983 Japan .
9649 1/1984 Japan .

Primary Examiner—William A. Cuchlinski, Jr.
Assistant Examiner—Patrick R. Scanlon

[57] ABSTRACT

The volume of the housing of a rear-projection system can be reduced by 20 to 25% when the light beam is obliquely incident on the projection screen. The obliquely incident light beam is deflected towards the viewing space by means of a prism plate (731). By dividing the light-refracting action of the prism plate between the front and rear of the plate only minor light loss occurs.

7 Claims, 3 Drawing Sheets

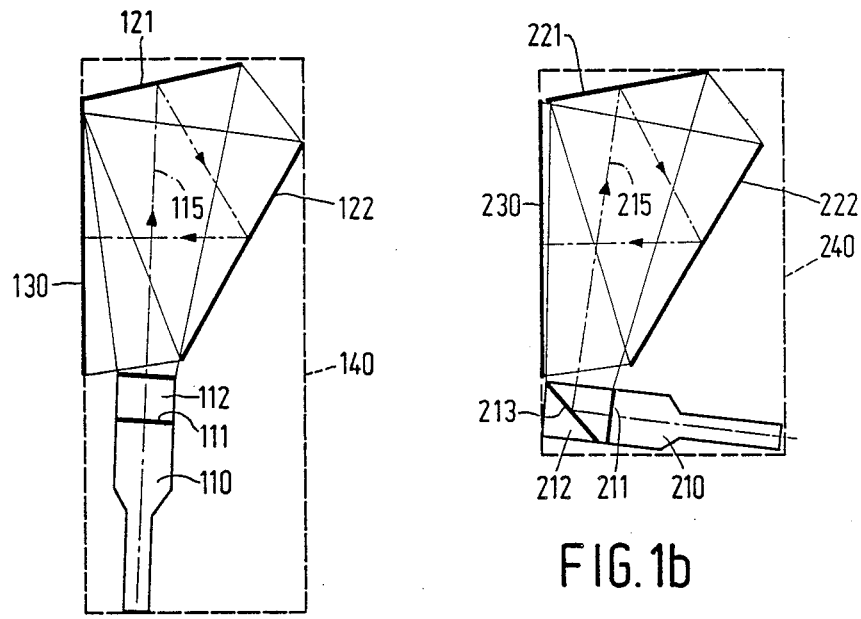
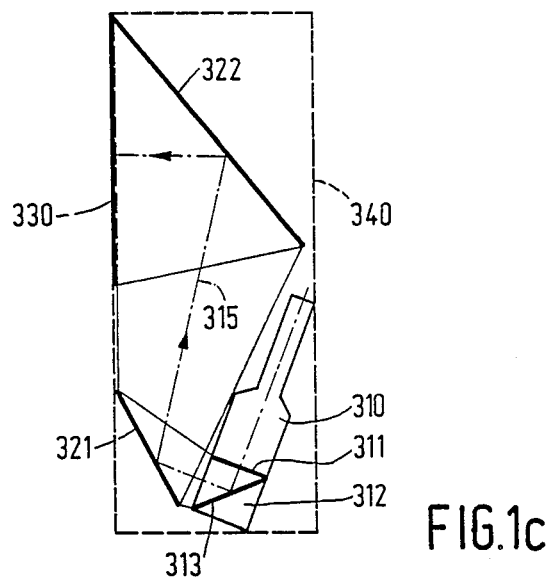
FIG.1a
FIG.1b
FIG.1c

COMPACT REAR-PROJECTION SYSTEM WITH OBLIQUELY INCIDENT LIGHT BEAM

BACKGROUND OF THE INVENTION

The invention relates to a rear-projection system including a screen, at least one image source with an associated projection-lens system, and at least one mirror intended for folding the light path.

In a rear-projection system the primary image produced by an image source is projected onto a first side, referred to as the rear, of the projection screen. This image can be observed by a viewer situated at the second side, referred to as the front, of the screen.

A rear-projection screen influences both the average direction of the emerging light and the dispersal of the light in the viewing space. These functions may be performed by separate optical elements but alternatively both functions may be performed by the same element. As used herein the term "projection plate" refers to that element of the projection screen in which the light is dispersed, regardless of whether this element also influences the average direction of the emerging light.

Rear-projection systems having one image source in the form of a cathode-ray tube for monochrome reproduction or three such image sources for color reproduction are employed for displaying a video program with substantially larger picture size than attainable by means of a conventional television picture tube.

A disadvantage of rear-projection systems is the large volume of the housing which accommodates the projection screen, the image source(s) and the projection lens system(s). Depending to some extent on the dimensions of the image source and the number and the arrangement of the mirrors the volume of this housing in the case of a screen diagonal of 140 cm (45 inches) is comparable in height to that of a tall book case or china cabinet.

U.S. Pat. No. 4,491,872 describes a rear-projection system whose housing comprises an elevatable housing section. The image source, the electronic circuitry and the power supply are accommodated in a stationary lower housing section of the apparatus. The rear-projection screen and one of the mirror are accommodated in the elevatable housing section. When the apparatus is not in use the elevatable housing section having the projection screen and the mirror is collapsed into the lower stationary housing section. The apparatus then occupies only a comparatively small volume. During use the elevatable section is in the elevated position to display a picture or scene on the screen.

Although in the collapsed position this system has a far more compact appearance than a similar apparatus in which the screen occupies a fixed position, the space occupied by the elevatable type of apparatus is not reduced significantly. The floor surface occupied in both cases is the same. The space above the apparatus in the collapsed condition can be utilized for other purposes only to a very limited extent, because it should remain free to elevate the projection screen and the mirror.

A second disadvantage is the construction of the elevatable-type of apparatus. It requires a large number of additional parts such as a drive motor, a mechanical transmission etc., which renders the apparatus more expensive and heavier.

SUMMARY OF THE INVENTION

It is the object of the present invention to provide a rear-projection system which in comparison with conventional systems has a substantially smaller volume. To this end the principal axis of the light beam from each image source intersects the rear surface of the projection screen at an angle of the order of some tens of degrees to the normal to this surface.

The invention is based on the recognition of the fact that a suitable choice the angle of incidence of the light beam from an image source onto the projection screen enables the folding mirror to be arranged in such a way that the cabinet volume is reduced, whilst the optical properties of the screen as regards the dispersion of light to the viewing space can be maintained.

In a preferred embodiment the angle of the principal axis of the light beam from an image source to the normal to the rear surface of the projection screen is substantially 30°. For an angle of 30° the volume reduction is substantial, whilst the steps, described hereinafter, which must be taken in order to compensate for the effects of the oblique incidence on the dispersion of light into the viewing space are practicable and present few problems. The projection screen includes a projection plate and a prism plate, which includes a plurality of truncated horizontally extending prisms combined to form a single plate, the rear of the prism plate constituting the rear of the projection screen. The prism plate causes the light beam issuing from the image source to be deflected in the same direction as the normal to the projection plate.

It is to be noted that U.S. Pat. No. 4,003,080 describes a display device for a video program which utilizes a light beam which is obliquely incident on the screen, which device includes a correction plate in order to ensure that the obliquely incident light beam emerges perpendicularly from the front of the screen.

However, this relates to a laser scanning system in which an intensity-modulated beam writes an image and does not relate to a projection device. The correction plate comprises a Fresnel lens or a series of superimposed mutually spaced narrow mirrors and it is not a prism plate.

In a first embodiment the prism plate comprises a plurality of identical and identically oriented prisms with equal apex angles. For light which is incident parallel to the principal axis of the light beam the angle of refraction at the rear of the prism plate is substantially equal to the angle of refraction at the front of the prism plate. In this configuration an apparent displacement of the image source towards the axis of the projection screen is approximated as closely as is possible by means of a comparatively simple prism plate comprising identically oriented prisms having equal apex angles.

In a second embodiment the prism plate has differently oriented prisms having different apex angles, the subbeam emerging from each prism appearing to intersect the normal to the projection screen in the centre in a common point, the angle of refraction at the rear of the prism plate being substantially equal to the angle of refraction at the front of the prism plate for the subbeam traversing each prism.

The common point where the subbeams emerging from the prism plate appear to intersect the normal to the projection screen in the center may be situated behind the screen. In this configuration the image source is apparently disposed on this normal to the projection screen.

The brightness in the various parts of the image as observed by the viewer may exhibit a substantial variation as a result of the use of a prism plate comprising identical and identically oriented prisms because the apparent position of the projection lens varies in different parts of the screen. The viewer observes these variations as dark bands at the upper and lower edges of the screen. The strength of this effect depends on the light-dispersing action of the projection plate. This disadvantage is eliminated by the above step.

A rear-projection screen generally comprises a correction plate, for example a Fresnel lens, which images the pupil of the projection lens in the viewing space. The diverging light beam issuing from the image source is oriented forwards into the viewing space substantially parallel or convergent. Such a Fresnel lens can be integrated in the prism plate.

In the second embodiment the subbeams issuing from the prism plate may intersect at a common point on the normal to the projection screen in the center which is situated in front of the screen. In this way a separate Fresnel in one direction may be dispensed with. This point of intersection may be situated at infinity, which means that the subbeams emerge parallel to the principal axis.

In a third embodiment a planoconvex cylindrical lens is arranged on the rear of each prism. This cylindrical lens disperses the light from the image source in a vertical direction into the viewing space, so that further measures in order to obtain a vertical dispersion of the light, such as the use of a diffusing layer, may be dispensed with. The radius of curvature of the planoconvex cylindrical lens determines the vertical angle at which the light is diffused. The planoconvex cylindrical lenses can be manufactured simultaneously with the prism plate in the same process step.

At least one side of the prism plate may be anti-reflecting. Loss of light as a result of reflection from the surface is reduced by means of this step.

BRIEF DESCRIPTION OF THE DRAWING

FIGS. 1a, 1b and 1c show schematically three prior art rear-projection systems in which the principal axis of the light beam extends perpendicularly to the projection screen.

In the Figures reference numerals whose last two digits are the same refer to similar elements.

DETAILED DESCRIPTION OF THE PREFERRED EMBODIMENTS

Figure 2A:
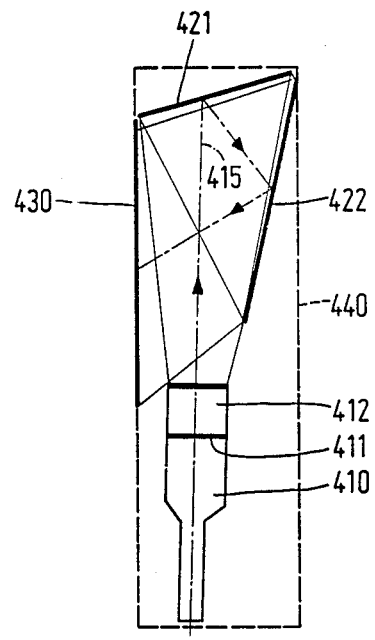
FIGS. 2a, 2b and 2c show schematically three embodiments of the invention comparable to the examples of FIGS. 1a, 1b and 1c but in which the principal axis of the light beam makes an angle of 30° to the normal to the projection screen.

In FIG. 1a a picture or scene is formed on the screen 111 of a cathode ray tube 110. The light beam which is emitted by this source and whose principal axis bears the reference numeral 115 is projected onto the rear of a rear-projection screen 130 via mirrors 121 and 122.

Instead of a single cathode-ray tube 110 for monochrome reproduction it is possible to employ a plurality of cathode-ray tubes and a corresponding number of projection-lens systems for colour reproduction of a picture or a scene. It is also possible to use any other form of composite image source. An example of this is a light source in combination with a transparency, for example a slide or film, arranged between the light source and the lens system. Alternatively, the image source may comprise a flat display device comprising a matrix of picture cells which depending on electronic signals reflect or absorb light or transmit or absorb light, and a light source. The electro-optical transducer described in British Patent Specification no. 1,387,712 may also be used as an image source. The image source(s), the mirrors and the rear-projection screen are accommodated in a housing 140.

FIGS. 1b and 1c show alternative configurations of prior art rear-projection systems in which the principal axis of the light beam is also perpendicular to the rear-projection screen (230 in FIG. 1b, 330 in FIG. 1c). These examples comprise a projection-lens system (212, 312) incorporating a mirror (213, 313), which in itself may lead to a reduction of the volume of the housing (240, 340).

Figure 2B:
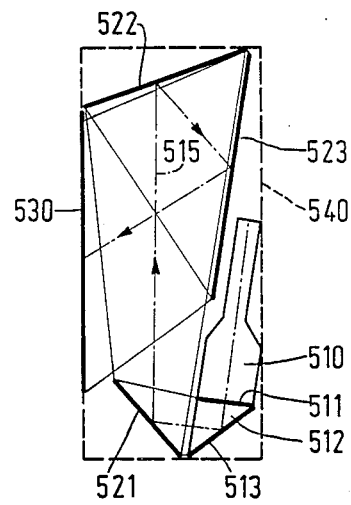
Figure 2C:
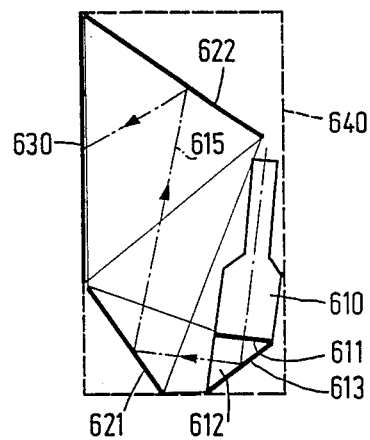

FIGS. 2a, 2b and 2c show three examples of rear-projection systems in accordance with the invention, in which the principal axis (415, 515 and 615 in the three Figures) of the light beam extends at an angle of approximately 30° to the normal to the projection screen (430, 530, 630). The radiation paths in FIGS. 2a, 2b and 2c are comparable to those in FIGS. 1a, 1b and 1c, respectively. A comparison of these Figures reveals that the systems in accordance with the invention have smaller volumes.

The following Table gives some characteristic dimensions of the various housing. In all these cases the screen has a diagonal of 114 cm (45 inches) and an aspect ratio of 3 to 4. For screen of other dimensions the specified dimensions should be adapted accordingly.

| System shown in FIG. | Dimensions H × W × D (cm³) | Volume (dm³) | Projection distance (cm) |
|---|---|---|---|
| 1a | 138 × 90 × 55 | 683 | 160 |
| 2a | 140 × 90 × 40 | 504 | 140 |
| 1b | 96 × 90 × 60 | 518 | 160 |
| 2b | 103 × 90 × 45 | 417 | 170 |
| 1c | 130 × 90 × 50 | 585 | 120 |
| 2c | 97 × 90 × 50 | 437 | 120 |

As can be seen in the Table the volume reduction owing to the use of the invention is approximately 20 to 25%. This may be achieved by reducing the height or the depth of the housing. A reduced width is not possible because this dimension is dictated by the size of the projection screen.

Figure 3:
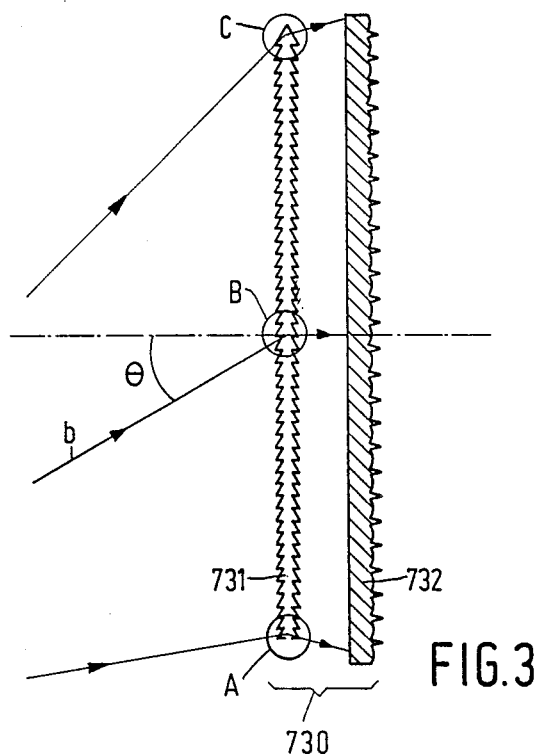
FIG. 3 illustrates the arrangement and the function of the prism plate.

FIG. 3 shows schematically a rear-projection screen 730 for use in an apparatus in accordance with the invention. The screen 730 includes a prism plate 731 and a projection plate 732 having light-dispersing elements which disperse the light issuing from the image source into the viewing space. The details of the projection plate 732 are determined by the requirements imposed on inter alia the light distribution in the horizontal and the vertical direction, the colour reproduction in the case that different image sources are employed for different colours, the brightness distribution over the screen etc. The literature describes a large number of possible constructions for a rear-projection screen. The prism plate 731 deflects the light beam b issuing from the image source, which beam has a principal axis which extends at an angle θ to the normal to the plate 731 in such a way that the principal axis of the emerging beam extends substantially perpendicularly to the projection plate 732.

Figure 4A:
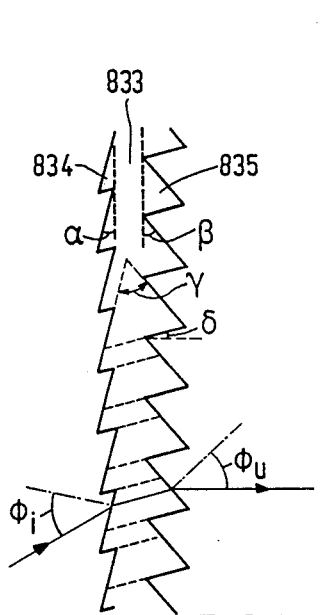
FIGS. 4a, 4b and 4c show different examples of the prism plate

FIG. 4a shows a part of a first example of the prism plate. This plate may be thought to comprise an imaginary plane-parallel plate 833, on both sides of which triangular light-refracting elements 834 and 835 are arranged so that an element 834, or a portion thereof, at the rear, an opposite portion of an element 835 at the front, and the intermediate portion of the plane-parallel plate 833 together form a truncated prism. This prism plate may be regarded as an array of identical and identically oriented prisms. Some of these prisms are indicated by means of broken lines. The prisms are characterized by the angles α and β between the refracting surfaces at the rear and at the front respectively and the plane of the imaginary plane-parallel plate, the sum of α and β, referred to as the apex angle γ, and by the angle δ between the third face of a prism and the normal to the prism plate. Suitably, the prisms are oriented in such a way that light which is incident parallel to the principal axis of the light beam is subject to a minimal deviation. This means that the angle of incidence $\phi_i$ on the rear facet of such an element 834 is equal to the exit angle $\phi_u$ at which the light emerges from the plane front facet of an element 835. By shifting the elements 834 and 835 relative to one another as is shown in FIG. 4a, a plate of smaller thickness can be formed.

The values of the angles α, β, γ and δ and their mutual relationships are dictated by the required refraction and the value of the refractive index of the material. For example, if the principal axis of the incident light beam extends at an angle θ of 30° to the normal to the plane of the prism plate, if the refractive index of the material of the prism plate is 1.5, and if a minimum deviation is required for light which is incident parallel to the principal axis, the apex angle γ should be 52° and the angles α and β should be 11° and 41° respectively. An optimum adaptation of the prisms is then obtained when the angle δ is 15°.

The above configuration of an array of identical and identically oriented prisms does not ensure that the light which emerges from the front of the prism plate appears to issue from one point behind the prism plate. As a result of this, the light which emerges from the projection plate into the viewing space has a dispersion characteristic which may exhibit substantial differences for different parts of the screen. The viewer may perceive these differences as dark bands at the top and bottom of the picture. The degree of this effect depends on the details of the projection plate 730. This drawback can be mitigated by adapting the apex angle γ and the orientation of each prism in such a way that the projection lens and the image source are apparently situated on the normal to the center of the projection screen.

Figure 4B:
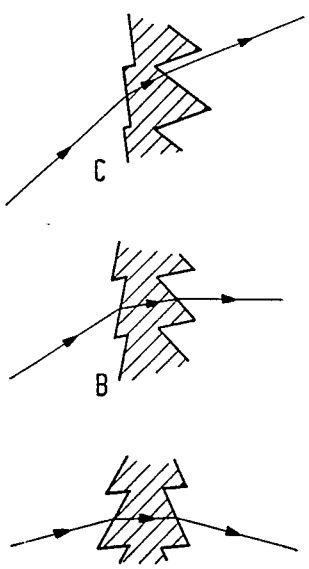

FIG. 4b shows an example of a prism plate in which the subbeam issuing from each prism appears to intersect the optical axis of the projection screen in the same point behind the plate. Suitably, the angles of each prism are selected so as to obtain a minimal deviation for each subbeam. In FIG. 4b a distinction can be made between the parts A, B and C, which correspond to the center of the plate (B) and the two extremes (A and C). These indications are also given in FIG. 3 for the purpose of orientation.

In the case of a projection distance of 120 cm and a screen height of 68 cm (this corresponds to a diagonal dimension of 114 cm and an aspect ratio of 3 to 4) the angles between the subbeams and the normal to the prism plate vary from 14° at A to 42° at C when the angle between the principal axis of the beam and the normal to the plane of the prism plate is 30°. Under these conditions and for a minimal deviation for each subbeam and a refractive index of the material of 1.5, the angle α between the facets at the rear of the prism plate and the plane of the prism plate should be 27° at A, 11° in the center (B), and −6° at C. The angle β should vary from 25° via 41° to 52°.

Figure 4C:
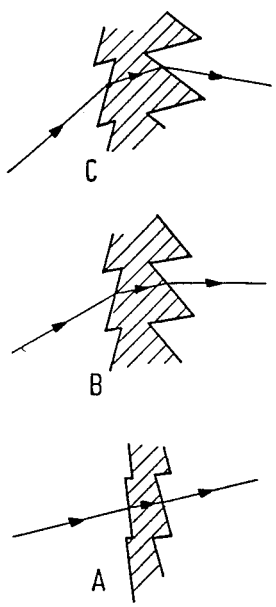

A rear-projection screen generally comprises a separate Fresnel lens by means of which the pupil of the projection lens is imaged in the viewing space. In one direction this Fresnel lens can be integrated in the prism plate by adapting the angles of refraction of each prism to the desired direction of a Fresnel facet at this location. FIG. 4c shows an example of a prism plate on which a Fresnel lens is superimposed, so that no separate Fresnel lens for the vertical direction is required in the remaining part of the rear-projection screen. Characteristic of this plate is that each subbeam is refracted by the corresponding prism in the prism plate towards the same point on the optical axis of the projection screen, which point is situated in front of the screen in the viewing space, for example at a distance of 2.5 m. When the other conditions are the same as in the situation described with reference to FIG. 4b, the angle α varies from −6° at A via 11° at B to 19° at C and the angle β varies from 17° via 41° to 52°.

The point where the subbeams intersect the optical axis of the screen may be selected to be situated at any desired distance from the screen, if desired at infinity by adapting the angles of refraction of the prisms.

Figure 5:
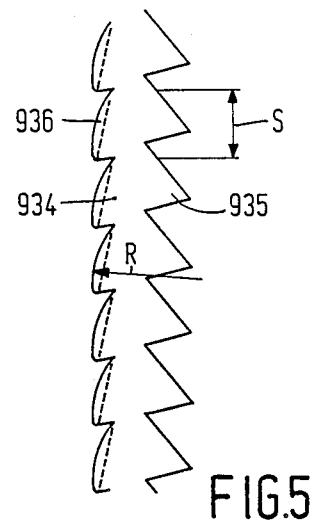
FIG. 5 shows a prism plate on whose prism facets planoconvex lenses are arranged.

Further, the rear-projection screen comprises elements which disperse the light in the viewing space. These elements may be cylindrical lenses arranged in the projection plate. Horizontally disposed cylindrical lenses for light dispersion in a vertical direction may be integrated in the prism plate by the use of convex instead of plan prism facets at one side of the plate. This is illustrated in FIG. 5, which shows a part of a prism plate in which such planoconvex cylindrical lenses 936 are integrated in the facets 934 at the rear of the prism plate. For a light dispersion through vertical angles between +10° and −10° when the material has a refractive index of 1.5 the radius R of the cylindrical lenses should be approximately 1.4 times the pitch S of the prism plate. Reflection from the curves surfaces may result in higher losses. In order to preclude this, the angle between the incident light and the normal to the prism plate should be limited to approximately 35° at the most. This means that for the dimensions of the screen and the projection distance as assumed in the above examples the angle θ between the principal axis of the light beam and the normal to the prism plate should be limited to approximately 20° at the most.

What is claimed is:

1. A rear-projection system comprising a rear-projection screen, at least one image source with an associated projection-lens system, and at least one mirror intended for folding the light path, the principal axis of the light beam from each image source intersecting the rear surface of the projection screen at an angle of the order of some tens of degrees to the normal to this surface, said rear-projection screen comprising a projection plate and a prism plate, said prism plate comprising a plurality of identical and identically oriented truncated horizontally extending prisms combined to form said prism plate, the rear of the prism plate constituting the rear of the projection screen, which prism plate causes the principal axis of the light beam issuing from the image source to be deflected in the same direction as the normal to the projection plate, each prism having a light-refracting front surface and a light-refracting rear surface, the light refracting front and rear surfaces of a number of prisms extending at an acute angle to the plane of the prism plate, and for light which is incident parallel to the principal axis of the light beam, the angle of incidence at the rear of the prism plate is substantially equal to the angle of refraction at the front of the prism plate.

2. A rear-projection system as claimed in claim 1, wherein a planoconvex cylindrical lens is arranged on the rear of each prism.

3. A rear-projection system as claimed in claim 1, wherein at least one side of the prism plate is anti-reflecting.

4. A rear-projection system as claimed in claim 1, wherein said acute angle is less than 30°.

5. A rear projection system comprising a rear-projection screen, at least one image source with an associated projection-lens system, and at least one mirror intended for folding the light path, the principal axis of the light beam from the at least one image source intersecting the rear surface of the projection screen at an angle of the order of some tens of degrees to the normal to this surface, said rear-projection screen comprising a projection plate and a prism plate, said prism plate comprising a plurality of truncated horizontally extending prisms, the rear of the prism plate constituting the rear of the projection screen, the prism plate causing the principal axis of the light beam issuing from the image source to be deflected in the same direction as the normal to the projection plate, each prism having light-refracting front and rear surfaces, the light refracting front and rear surfaces of a number of prisms extending at an acute angle to the plane of the prism plate, the prisms on either side of the principal axis having mutually different orientations and mutually different apex angles, the subbeam emerging from each prism at least appearing to intersect the normal to the projection screen in the center in a common point, the angle of incidence at the rear of the prism plate being substantially equal to the angle of refraction at the front of the prism plate for the subbeam traversing each prism.

6. A rear-projection system as claimed in claim 5, wherein the common point where the subbeams emerging from the prism plate appear to intersect the normal to the projection screen in the center is situated behind the screen.

7. A rear-projection system as claimed in claim 5, wherein the subbeams emerging from the prism plate intersect at a common point on the normal to the projection screen in the center, said point being situated in front of the screen.

* * * * *